(12) United States Patent
Kaiduka

(10) Patent No.: US 7,957,300 B2
(45) Date of Patent: Jun. 7, 2011

(54) NETWORK MANAGEMENT APPARATUS AND METHOD THEREOF

(75) Inventor: Tomonori Kaiduka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 80 days.

(21) Appl. No.: 12/396,618

(22) Filed: Mar. 3, 2009

(65) Prior Publication Data

US 2009/0225663 A1 Sep. 10, 2009

(30) Foreign Application Priority Data

Mar. 5, 2008 (JP) .................................. 2008-055599

(51) Int. Cl.
*H04L 12/26* (2006.01)
(52) U.S. Cl. .......................... 370/245; 370/242; 370/400
(58) Field of Classification Search .......................... None
See application file for complete search history.

(56) References Cited

U.S. PATENT DOCUMENTS

| 6,970,919 | B1 | 11/2005 | Doi et al. |
| 7,774,447 | B2 * | 8/2010 | Chahal et al. ................. 709/223 |
| 2002/0167898 | A1 * | 11/2002 | Thang et al. .................. 370/216 |
| 2005/0058081 | A1 * | 3/2005 | Elliott ........................... 370/252 |
| 2005/0149625 | A1 * | 7/2005 | Rouyer et al. ................. 709/220 |
| 2005/0195747 | A1 * | 9/2005 | Stamps et al. ................. 370/241 |
| 2006/0198315 | A1 * | 9/2006 | Sasagawa et al. ............. 370/244 |
| 2007/0081461 | A1 * | 4/2007 | Denecheau et al. .......... 370/231 |
| 2007/0159986 | A1 * | 7/2007 | Park et al. ..................... 370/254 |
| 2007/0177609 | A1 * | 8/2007 | Alexander ............... 370/395.32 |
| 2008/0112331 | A1 * | 5/2008 | Long et al. ..................... 370/245 |
| 2008/0215910 | A1 * | 9/2008 | Gabriel et al. ..................... 714/4 |
| 2008/0291822 | A1 * | 11/2008 | Farkas et al. ................. 370/216 |
| 2010/0146324 | A1 * | 6/2010 | Sajassi et al. ..................... 714/2 |

FOREIGN PATENT DOCUMENTS

JP 2005-45840 2/2005

* cited by examiner

*Primary Examiner* — Donald L Mills
(74) *Attorney, Agent, or Firm* — Katten Muchin Rosenman LLP

(57) ABSTRACT

A network management apparatus in a network that includes a physical network, and a logical network assigned to the physical network performs: acquiring nodes stored in a distance information storage unit with distances larger than a distance for a node identified by fault information, and a service providing device to which the nodes are connected from the distance information storage unit when the fault information is received; acquiring link information stored in a link information storage unit based on the nodes acquired by a node acquisition unit; and a fault area identification unit that acquires information on a device connected to nodes indicated by the link information acquired by a link information acquisition unit, and identifies the acquired device information, the service providing device acquired, and link information acquired as an area on which the fault influences.

6 Claims, 26 Drawing Sheets

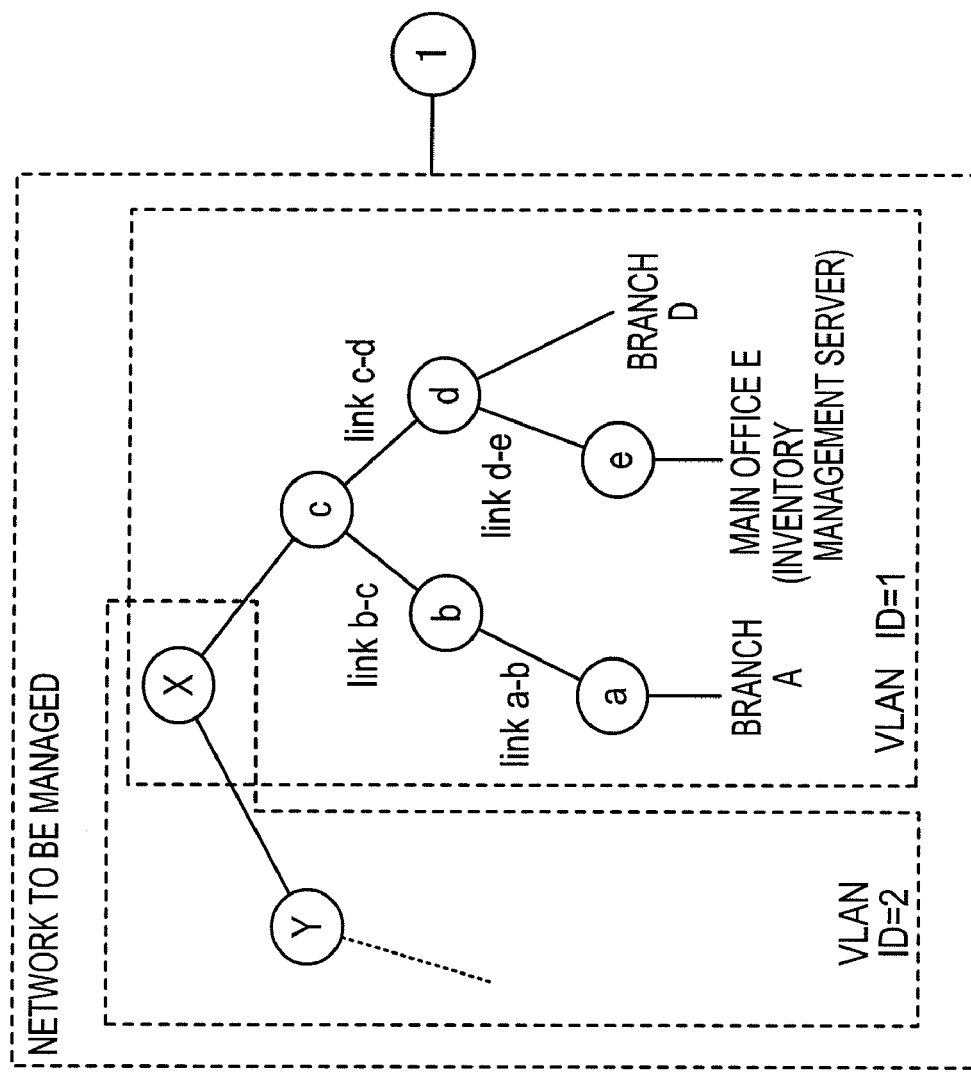

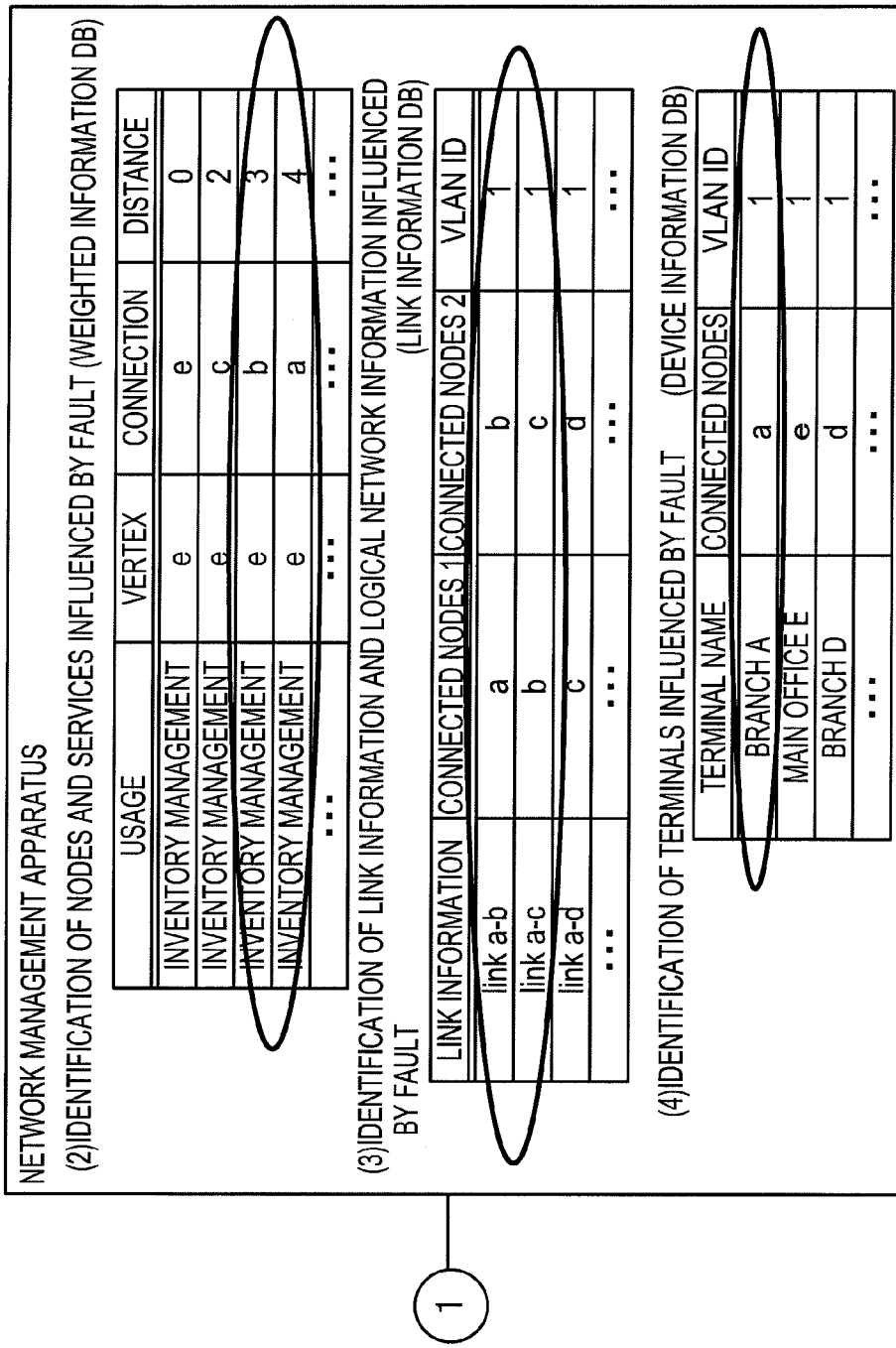

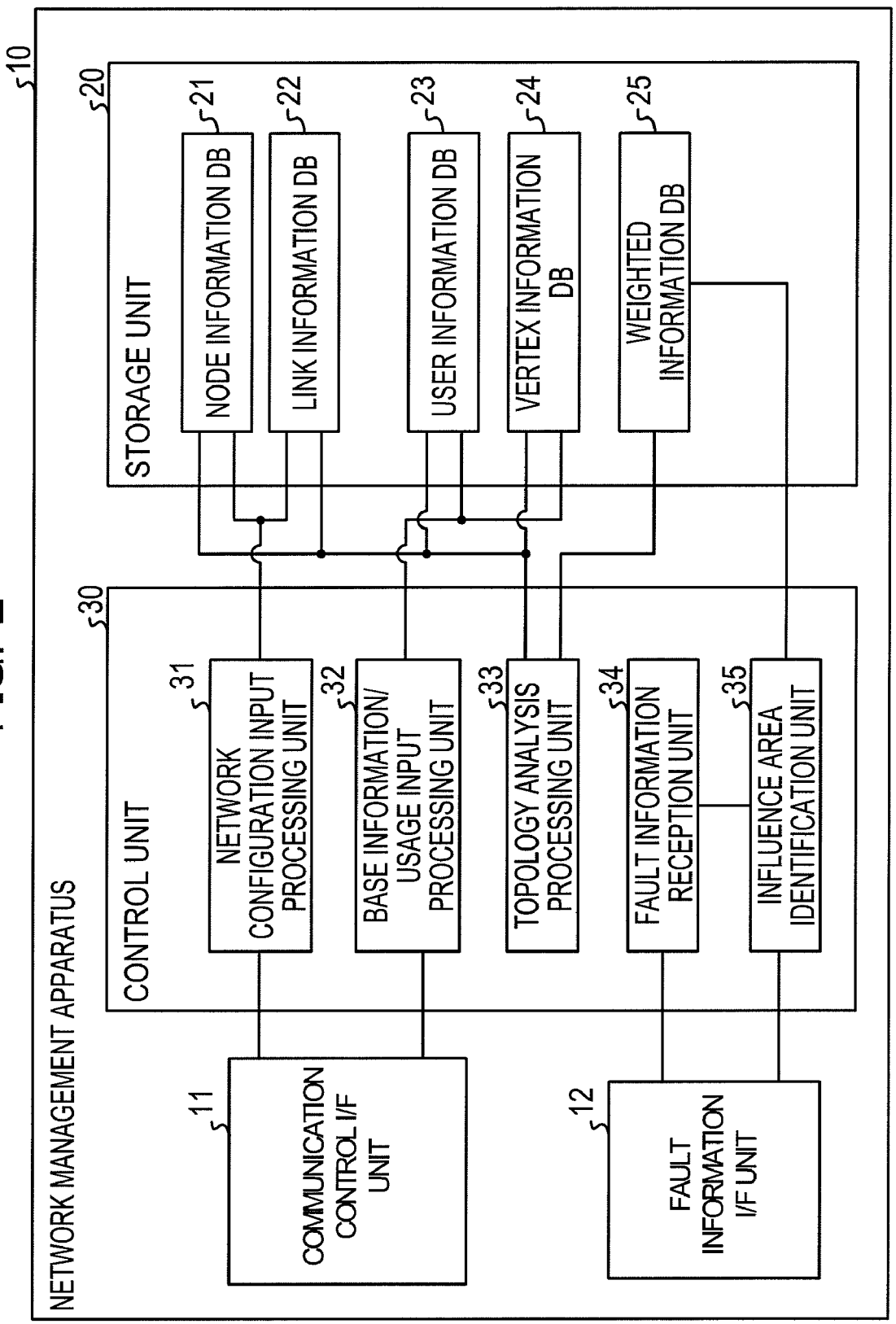

FIG. 3

| UPDATE DATE AND TIME | 7/1 11:00:00 | ... |
|---|---|---|
| DELETION FLAG | DELETED | ... |
| NODE NAME | NODE A | ... |

FIG. 4

| UPDATE DATE AND TIME | DELETION FLAG | LINK IDENTIFIER | CONNECTION NODE 1 | CONNECTION NODE 2 | TRANSPARENT LOGICAL IDENTIFIER |
|---|---|---|---|---|---|
| 7/1 11:00:00 | DELETED | link a-b | a | b | VLAN ID 10,20,30 |
| ... | ... | ... | ... | ... | ... |

FIG. 5

| LOGICAL IDENTIFIER | VLAN ID 10 | ... |
|---|---|---|
| EDGE | a | ... |
| SITE OF USE | BRANCH A | ... |

FIG. 6

| USAGE | VERTEX SITE |
|---|---|
| INVENTORY MANAGEMENT SYSTEM | BRANCH A |
| ... | ... |

FIG. 7

| USAGE | INVENTORY MANAGEMENT SYSTEM | ... |
|---|---|---|
| VERTEX | e | ... |
| NODE | a | ... |
| DISTANCE | 3 | ... |

FIG. 10

| UPDATE DATE AND TIME | DELETION FLAG | NODE NAME |
|---|---|---|
| 3/1 12:00 | | a |
| 3/1 13:00 | | b |
| 3/1 11:11 | DELETED | c |
| 3/1 14:00 | | d |
| 4/13 12:00 | | e |
| 4/13 12:00 | | f |

FIG. 11

| UPDATE DATE AND TIME | DELETION FLAG | LINK INFORMATION | CONNECTION NODE 1 | CONNECTION NODE 2 | TRANSPARENT VLAN |
|---|---|---|---|---|---|
| 3/1 12:00 | | link a-b | a | b | 10 |
| 3/1 13:00 | DELETED | link b-c | b | c | 10 |
| 3/1 11:11 | DELETED | link c-d | c | d | 10 |
| 4/13 12:00 | | link d-e | d | e | 10 |
| 4/13 12:00 | | link d-f | d | f | 10 |

FIG. 13

| USAGE | VERTEX | NODE | DISTANCE |
|---|---|---|---|
| INVENTORY MANAGEMENT | e | e | 0 |
| INVENTORY MANAGEMENT | e | d | 1 |
| INVENTORY MANAGEMENT | e | c ✕ | 2 |
| INVENTORY MANAGEMENT | e | f | 2 |
| INVENTORY MANAGEMENT | e | b ✕ | 3 |
| INVENTORY MANAGEMENT | e | a ✕ | 4 |

NOT DELETED AS DISTANCES ARE SMALL

FIG. 14

| USAGE | VERTEX | NODE | DISTANCE |
|---|---|---|---|
| INVENTORY MANAGEMENT | e | e | 0 |
| INVENTORY MANAGEMENT | e | d | 1 |
| INVENTORY MANAGEMENT | e | f | 2 |

FIG. 19

| USAGE | VERTEX | DEVICE | DISTANCE |
|---|---|---|---|
| INVENTORY MANAGEMENT | e | e | 0 |
| INVENTORY MANAGEMENT | e | d | 1 |
| INVENTORY MANAGEMENT | e | c | 2 |
| INVENTORY MANAGEMENT | e | f | 2 |
| INVENTORY MANAGEMENT | e | b | ③ |
| INVENTORY MANAGEMENT | e | a | ④ |

NETWORK MANAGEMENT APPARATUS AND METHOD THEREOF

CROSS-REFERENCE TO RELATED APPLICATIONS

This application is based upon and claims the benefit of priority of the prior Japanese Patent Application No. 2008-055599, filed on Mar. 5, 2008, the entire contents of which are incorporated herein by reference.

BACKGROUND

The present disclosure relates to a network management apparatus and method thereof for identifying influence of a fault occurring in a physical network that includes a plurality of nodes and service providing devices connected to the plurality of nodes, and user terminals that use services.

Description of the Related Art

When a communication carrier, etc. provides a multipoint communication network, in many cases, a network plane (a logical network plane) that may be logically communicated is created for a physical network and an environment for communication is provided in units of the logical network planes.

As illustrated in FIG. 23, a user who is provided with an environment using Virtual Local Area Network (VLAN) in which a virtual network plane is created for each of VLANIDs may freely communicate within the area where the VLANID is transparent. FIG. 23 illustrates that client terminals C1 to C3 are VLAN-connected (VLAN ID=1) via devices 1 to 4 in a physical network where devices 1 to 6 and client terminals C1 to C5 are interconnected. Moreover, C4 and C5 are connected by a different VLAN (VLAN ID=2) via a device 5 and a device 6. In this case, C1 to C3 may intercommunicate via devices 1 to 4; however C1 to C3 may not intercommunicate with C4 and C5 that are connected via a different VLAN even if all of C1 to C5 are in the same physical network.

When an area on which a fault influences in the above network is to be identified, a physical network and a logical network plane are associated to identify the area. More specifically, when a fault occurs in a device 4 in a network illustrated in FIG. 23 (refer to FIG. 24), a telecommunications carrier that operates the network identifies a VLAN with VLAN ID=1 connected via the device 4 as a network on which the fault influences. A VLAN with VLAN ID=2 is not connected via the device 4, thus, it is assumed that the VLAN is not identified as a network on which the fault influences.

According to Laid-open Patent Publication No. 2005-45840, a network management system is disclosed that further defines several services in a logical network plane, and identifies services influenced by a fault depending on kinds of alarms generated at occurrence of a fault. This network management system identifies, as in the above described example, all terminals connected to a logical network plane and services that are connected to a device where the fault occurs.

According to the above-described conventional technology, when a fault occurs in a physical network and an area on which a fault influences is identified, there is a drawback that it is not possible to identify where a fault influences in units of terminals connected to the logical network.

The above drawback will be described more specifically. As illustrated in FIG. 25, a physical network includes devices 1 to 5 and client terminals C1 and C2, and a server apparatus C3, and C1 to C3 are connected by a virtual network. Under these circumstances, it is assumed that a fault occurs at the device 1. In this case, communications between C1 to C2, and C1 to C3 are disconnected. However, the above described conventional technology identifies an area on which a fault influences in units of virtual network planes, thus it is judged that communications among all of C1, C2, and C3 are disconnected even when communications between C2 and C3 are actually established before and after the fault.

SUMMARY

A network management apparatus in a network that includes a physical network, and a logical network assigned to the physical network comprises: a link information storage unit storing link information that indicates connection relationship between nodes in the physical network and information on a logical network to which the link information belongs; a device information storage unit storing a node to which the service providing device or the user device is connected and information on a logical network to which the device belongs to by associating with the service providing device or the user device; a distance information storage unit storing, a node connected to the service providing device, and a distance between the node and other node to which the service providing device is connecting; a node acquisition unit for acquiring nodes stored in the distance information storage unit with distances larger than a distance for a node identified by the fault information, and a service providing device to which the nodes are connected from the distance information storage unit when information that indicates fault information is received; a link information acquisition unit for acquiring link information stored in the link information storage unit based on the nodes acquired by the node acquisition unit; and a fault area identification unit that acquires information on a device connected to nodes indicated by the link information acquired by the link information acquisition unit from the device information storage unit, and identifies the acquired device information, the service providing device acquired by the node acquisition unit, and link information acquired by the link information acquisition unit as an area on which the fault influences.

BRIEF DESCRIPTION OF DRAWINGS

FIGS. 1A and 1B illustrate an entire system configuration of a network management apparatus of a first embodiment;

FIG. 2 is a block diagram illustrating a configuration of a network management apparatus of the first embodiment;

FIG. 3 illustrates an example of information stored in a node information DB (database);

FIG. 4 illustrates an example of information stored in a link information DB;

FIG. 5 illustrates an example of information stored in a user information DB;

FIG. 6 illustrates an example of information stored in a vertex information DB;

FIG. 7 illustrates an example of information stored in a weighted information DB;

FIG. 10 is an example of updating a node information DB;

FIG. 11 is an example of updating a link information DB;

FIG. 13 is an example of calculation of nodes to be deleted in a weighted information DB;

FIG. 14 is an example of information to be stored in a new weighted information DB from which nodes are deleted;

FIG. 19 is an example to identify information on nodes in an area influenced by a fault;

DESCRIPTION OF EMBODIMENTS

Figure 8:
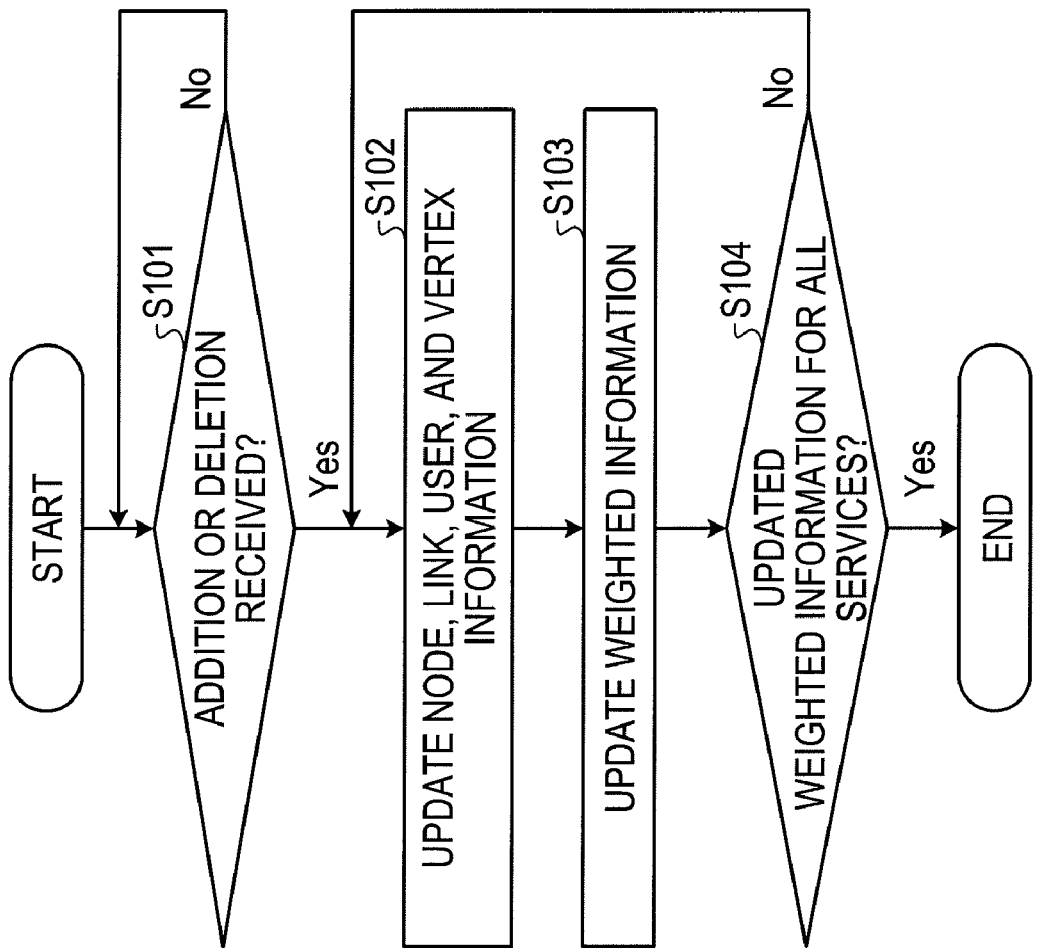
FIG. 8 is a flowchart illustrating addition and deletion of nodes by a network management apparatus of the first embodiment.

Embodiments of a network management apparatus, a network management method of an aspect of the present disclosure will be described in detail with reference to accompanying drawings. Hereunder, an overview and characteristics of the network management apparatus of this embodiment, the configuration and processing flow will be sequentially described. Finally, various alternative embodiments for the embodiments will be described.

(Overview and Characteristics of Network Management Apparatus)

First, an overview and characteristics of a network management apparatus of a first embodiment will be described with reference to FIGS. 1A and 1B. FIGS. 1A and 1B illustrate an entire configuration of a network management apparatus of the first embodiment.

As illustrated in FIGS. 1A and 1B, the network management apparatus is connected to a network that the apparatus manages including a fault, and to a fault management device that notifies information, such as a fault occurring in the network to be managed, to the network management apparatus via a network, respectively.

The network to be managed includes a physical network and a logical network. The physical network includes a plurality of nodes that represent routers and switches that relay various data, and terminals connected to the plurality of nodes (such as user terminals or service providing servers). The logical network is assigned to the physical network and may be logically communicated. According to this embodiment, the network to be managed includes a plurality of VLANs (VLAN ID=1, VLAN ID=2) that are logical networks. In this embodiment, explanation will focus on the VLAN ID=1.

More specifically, a logical network of VLAN ID=1 in a network to be managed includes a node "X", nodes "a" to "e", a "branch A" (a client terminal) connected to the node "a", a "branch D" connected to the node "d", and a "main (head) office E" (an inventory management server) connected to the node "e". This means, in a virtual network of VLAN ID=1, an inventory management system is operated, and the "branch A" and "branch D" are connected to the inventory management server of the "main office E", thereby the inventory is managed.

With this configuration, the network management apparatus of the first embodiment identifies a fault occurring in a physical network that includes a plurality of nodes relaying various data and terminals (client terminals and a inventory management server) connected to the plurality of nodes and a logical network that may be logically communicated assigned to the physical network. A main characteristic of the first embodiment is that when identifying an area on which a fault in the physical network influences, it is possible to identify the area in units of terminals connected to the logical network plane.

Now the main characteristic will be described more specifically here. The network management apparatus provides a link information DB (database) that stores link information that indicates connection relationships between nodes, and logical network information that indicates information on a logical network to which the link information belongs. The characteristic is described more specifically by referring to the above configuration. The link information DB stores "link information" that indicates a node to be connected, a "connection node 1" and a "connection node 2" that indicate each of nodes to be connected to the link information, and a "VLAN ID" that indicates a virtual network to which the link is connected. More specifically, the link information DB stores "link a-b, a, b, 1" and "link b-c, b, c, 1", and "link c-d, c, d, 1."

The network management apparatus provides a device information DB that stores a node to which a terminal is connected and information on a logical network to which the terminal belongs to by associating with the terminal. Now, referring to the above example of FIG. 1B, the device information DB stores a "terminal name" that indicates a name of a terminal, a "connected node" that indicates a node to which the terminal is connected, and a "VLAN ID" that indicates a virtual network to which the terminal is connected. More specifically, the device information DB stores information such as "branch A, a, 1", "main office E, e, 1", and "branch D, d, 1."

The network management apparatus provides a weighted information DB that stores a node connected to a service providing device and a distance between the node and the service providing device by associating with service names that indicate various services. Referring to the above example of FIG. 1B, the weighted information DB stores "usage" that indicates a name of various services provided, "vertex" that indicates a node to which the service providing device that provides the service is connected, "connection" that indicates nodes comprising the service, and "distance" that indicates a distance from the service providing device (an inventory management server) that provides the service. More specifically, the weighted information DB stores "inventory management, e, e, 0", "inventory management e,d,1", "inventory management e,c,2", "inventory management e,f,2", "inventory management e,b,3", and "inventory management e,a,4."

Under the above condition, when the network management apparatus receives fault information, the apparatus acquires nodes with distances larger than a distance for a node identified by the fault information, and a service name to which the node is connected in the weighted information DB (refer to (1) and (2) in FIG. 1B). For example, in FIG. 1B, the network management apparatus receives fault information (for example, hardware failure and line disconnection) that indicates a fault occurring at a node "c" from a fault management device. The network management apparatus identifies "inventory management e, c, 2" corresponding to the node identified by the fault information stored in the weighted information DB. Then, the network management apparatus acquires "inventory management e, b, 3" and "inventory management e, a, 4" as nodes located with distances larger than the identified distance "2."

Subsequently, the network management apparatus acquires link information stored in link information DB based on the acquired nodes (refer to (3) of FIG. 1). Referring to the example of FIGS. 1A and 1B described above, based on the acquired "inventory management e, b, 3" and "inventory management e, a, 4", the network management apparatus acquires link information between nodes "b" and "c" that is "link b-c, b,c,1", and link information between nodes "a" and "b" that is "link a-b, a,b,1" as link information of nodes "a" to "c" stored in the link information DB.

After that, the network management apparatus acquires information on a device connected to nodes indicated by the acquired link information from a device information DB, and identifies the acquired node information, service name and link information as an area on which the fault influences (refer to (4) of FIG. 1B). For example, in FIG. 1B, the network management apparatus acquires "branch A, a, 1" stored in the device information DB among nodes "a", "b", and "c" indicated by the acquired link information "link b-c, b,c,1", and "link a-b, a,b,1." Then, the network management apparatus identifies the acquired device information that is "branch A, a, 1", service name that is "inventory management", and link information that is "link b-c, b, c, 1", and "link a-b, a, b, 1" as an area on which the fault influences.

As described above, the network management apparatus of the first embodiment may identify nodes to be influenced by a fault and devices connected to the nodes based on a distance from a node where a fault occurs. Thus, when identifying an area on which a fault in the physical network influences, it is possible to identify the area in units of terminals connected to a logical network plane.

(Configuration of Network Management Apparatus)

A configuration of the network management apparatus illustrated in FIG. 1B will be described by referring to FIG. 2. FIG. 2 is a block diagram illustrating a configuration of a network management apparatus of a first embodiment. As illustrated in FIG. 2, the network management apparatus 10 includes a communication control I/F unit 11, a fault information I/F unit 12, a storage unit 20, and a control unit 30.

The communication control I/F unit 11 controls communication for various information transmitted to and received from an administrator's device that manages the network management apparatus. For example, the communication control I/F unit 11 is connected to units such as a network configuration input processing unit 31 and a base information/usage input processing unit 32 of a control unit 30 and receives information such as addition and deletion of nodes in a network to be managed and information on addition and deletion of service providing devices and user terminals from the administrator's device.

A fault information I/F unit 12 controls communication for various information transmitted to and received from a fault management device. More specifically, the fault information I/F unit 12 is connected to units such as a fault information reception unit 34 and an influence area identification unit 35, and receives information on a fault (for example, a fault occurs in a node "c") occurring in a network to be managed by a network management apparatus 10 from the fault management device.

A storage unit 20 stores data and program required for various processing performed by the control unit 30. As units closely related to this disclosure, the storage unit 20 includes a node information DB21, a link information DB22, a user information DB23, a vertex information DB24, and a weighted information DB25. Information that includes various data and parameters may be optionally changed unless otherwise specified.

The node information DB21 stores information on each of a plurality of nodes. More specifically, as illustrated in FIG. 3, the node information DB21 stores information such as "update date and time" that indicates when addition and deletion is performed, "deletion flag" that indicates whether or not a node is deleted, and "node name" that indicates a name of a node. For example, the DB 21 stores "7/1 11:00:00, deletion, node a". The node information DB 21 corresponds to "node information storage unit" described in the appended claims. Moreover, FIG. 3 illustrates an example of information stored in a node information DB.

The link information DB22 stores link information that indicates connection relationships between nodes in a physical network, and logical network information that indicates information on a logical network to which the link information belongs. More specifically, as illustrated in FIG. 4, the link information DB22 stores information such as "update date and time" that indicates when addition and deletion is performed, "deletion flag" that indicates whether or not the link is deleted, and "link identifier" that indicates connection of adjacent nodes, "connection node 1" that indicates one end of adjacent nodes, "connection node 2" that indicates the other end of adjacent nodes, "transparent logical identifier" that indicates transparent logical network planes. For example, the DB 22 stores "7/1 11:00:00, deletion, link a-b, a, b, VLAN ID 10, 20, 30". FIG. 4 illustrates an example of information stored in a link information DB.

The user information DB 23 stores a node to which a terminal is connected and information on a logical network information to which the terminal belongs to by associating with the terminal. More specifically, as illustrated in FIG. 5, the user information DB23 stores "logical identifier" that indicates an assigned logical network plane, "edge" that indicates an end node to which a user is connected, "site of use" that indicates a site where a user uses. For example, the user information DB 23 stores "VLAN ID 10, a, branch A." Moreover, FIG. 5 illustrates an example of information stored in a user information DB.

The vertex information DB 24 stores a service name that indicates various services by associating with nodes connected to a service providing device that provides the service. More specifically, as illustrated in FIG. 6, the vertex information DB 24 stores "usage" that indicates a service name of various services, and "vertex site" that indicates a node connected to a service providing device that provides various services. For example, the vertex information DB 24 stores "inventory management system, branch A." FIG. 6 illustrates an example of information stored in a vertex information DB.

The weighted information DB 25 stores a node connected to a service providing device and a distance between the node to which the service providing device is connected and another node by associating with a service name that indicates various services. More specifically, as illustrated in FIG. 7, the weighted information DB 25 stores "usage" that indicates a name of various services, "vertex" that indicates a node to which the service providing device that provides the service is connected, "node" that indicates a node that VLAN is transparent, and "distance" that indicates a distance (the number of connections) from the node (a vertex device) to which the service providing device is connected to the other "node." For example, the weighted information DB 25 stores information such as "inventory management system, e, a, 3." FIG. 7 illustrates an example of information stored in a weighted information DB.

A control unit 30 has an internal memory for storing a control program such as on operating system (OS), and programs in which various processing procedures are specified, and required data. Units closely relate to the control unit 30 include a network configuration input processing unit 31, a base information/usage input processing unit 32, a topology analysis processing unit 33, a fault information reception unit 34, and an influence area identification unit 35. By collaborating with these units, the control unit 30 performs various processing.

The network configuration input processing unit 31 updates a node information DB21 and a link information DB 22 based on information received from an administrator's device that operates the network management apparatus 10 via a communication control I/F unit 11. More specifically, when the network configuration input processing unit 31 receives information that indicates a node "f" is added (for example, a node "f" is added to a node "d" from an administrator's device, the network configuration input processing unit 31 adds a line of a node "f" that is "update date and time, deletion flag, node name" to the node information DB 21. The network configuration input processing unit 31 also adds connection relationship between the node "f" and the node "d", "update date and time, deletion flag, link identifier, connection node 1, connection node 2, transparent logical identifier" to the link information DB 22. Moreover, when the network configuration input processing unit 31 receives information that indicates a node "e" is deleted by an administrator's device, the network configuration input processing unit 31 sets a deletion flag for the node "e" stored in the node information DB 21, and sets another deletion flag for link information that has a connection relationship with the node "e" in the link information DB22.

The base information/usage input processing unit 32 updates a user information DB23 and a vertex information DB24 based on information received from an administrator's device that operates the network management apparatus 10 via the communication control I/F unit 11. More specifically, when the base information/usage input processing unit 32 receives information that indicates a branch B is newly added to a node "b", the base information/usage input processing unit 32 newly stores "VLAN ID 1, b, branch B" as "logical identifier, edge, usage site" in the user information DB23. Moreover, when the base information/usage input processing unit 32 receives information that indicates a mail server is newly connected at a branch A from the administrator's device, the base information/usage input processing unit 32 stores information such as "mail system, branch A" as "usage, vertex site" in the vertex information DB24.

The topology analysis processing unit 33 creates a topology of a network to be managed and updates the weighted information DB25. More specifically the topology analysis processing unit 33 refers to the node information DB 21 and the link information DB 22 periodically or by an instruction from the administrator's device and acquires information on added or deleted nodes. The topology analysis processing unit 33 also refers to the user information DB23 and the vertex information DB24, and acquires newly connected user terminals and service providing devices and service names, and newly creates a topology of a network to be managed. The topology analysis processing unit 33 updates information stored in the weighted information DB25 based on the newly created topology.

The fault information reception unit 34 receives various fault information in a network to be managed from an administrator's device. More specifically, the fault information reception unit 34 receives various fault information (for example, a fault occurs at a node "c") in a network to be managed from administrator's devices via the fault information I/F unit 12 and notifies the received fault information to an influence area identification unit 35 that will be described later.

When the influence area identification unit 35 receives fault information, the unit 35 acquires nodes with distances larger than a distance for a node identified by the fault information and service names to which the nodes are connected from the weighted information DB 25. Then based on the acquired nodes, the influence area identification unit 35 acquires link information stored in the link information DB 22, and information on a device connected to the nodes indicated by the acquired link information from the node information DB21. Then, the influence area identification unit 35 identifies the acquired device information, the service name and the link information as an area on which the fault influences.

For example, when the influence area identification unit 35 receives fault information (a fault occurs at a node "c") from the fault information reception unit 34, the influence area identification unit 35 acquires nodes "a" and "b" with distances larger than a distance "2" for a node "c" stored in the weighted information DB25 and also acquires the service name to which the nodes "a" and "b" are connected from the weighted information DB 25. Then, the influence area identification unit 35 acquires link information "link a-b, link b-c" stored in the link information DB22 based on the acquired nodes "a" and "b". Subsequently, the influence area identification unit 35 acquires information on the device "branch A" connected to nodes "a", "b", and "c" indicated by the acquired link information "link a-b, link b-c" from the node information DB21. Then, the influence area identification unit 35 identifies the acquired device information "branch A", the service name "inventory management system" and the link information "link a-b, link b-c" as an area on which the fault influences.

(Addition and Deletion of Nodes by Network Management Apparatus)

Now, addition and deletion of nodes by a network management apparatus will be described by referring to FIG. 8. FIG. 8 is a flowchart illustrating addition and deletion of nodes by a network management apparatus of the first embodiment.

As illustrated in FIG. 8, when the network management apparatus 10 receives information that indicates addition or deletion of nodes, service providing devices, and user terminals via a communication control I/F unit 11 (Step S101; Yes), a network configuration input processing unit 31 or a base information/usage input processing unit 32 of the network management apparatus 10 updates a node information DB 21, a link information DB 22, a user information DB 23, and a vertex information DB 24 (Step S102).

Then, a topology analysis processing unit 33 of the network management apparatus 10 updates a weighted information DB 25 after reaching a given time (Step S103) and if the weighted information DB 25 is updated for all of services provided by a network to be managed (Step S104; Yes), the processing completes. If the weighted information DB 25 is not updated for all of services (Step S104; No), the processing after the step S102 is executed.

Figure 9:
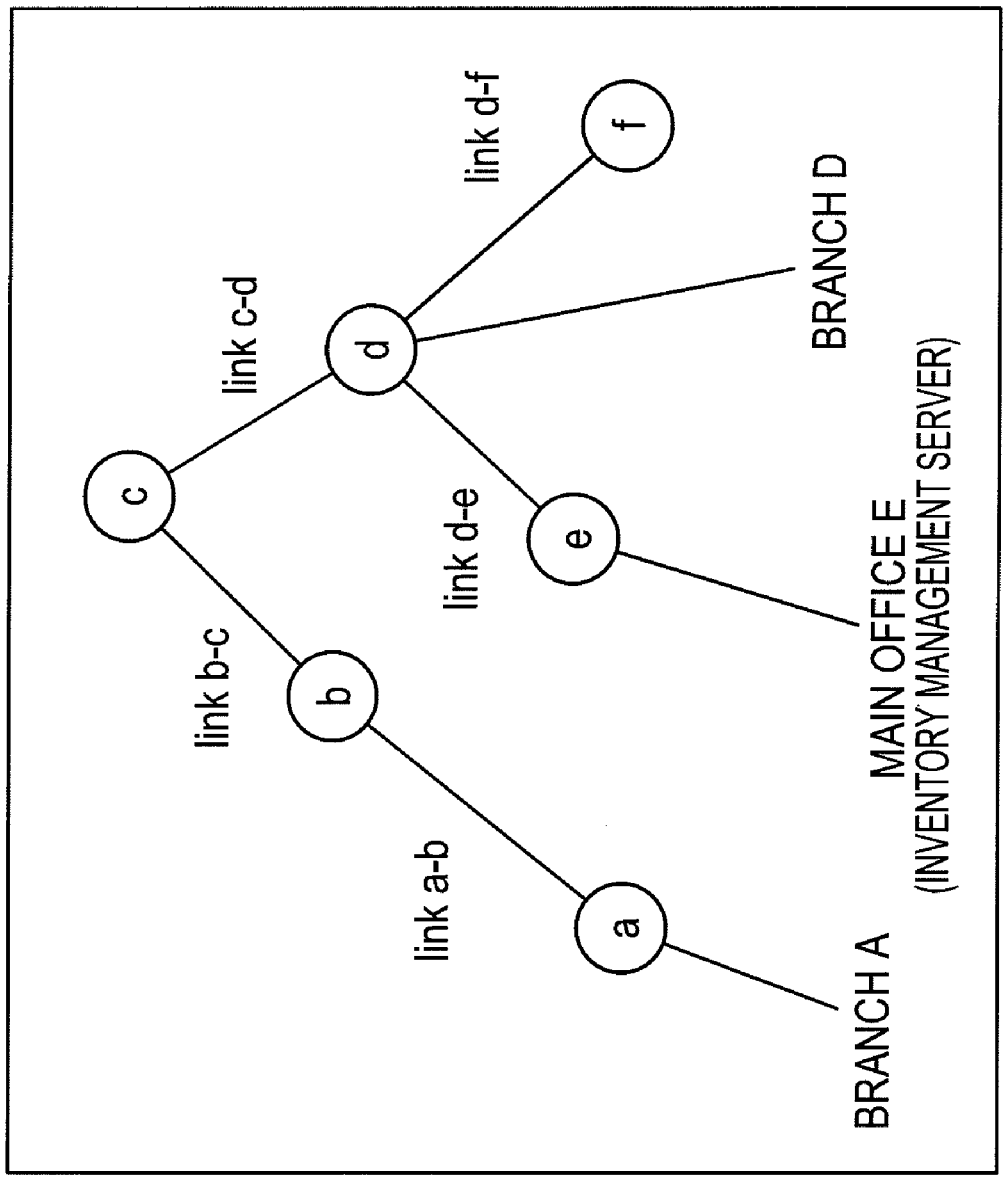
FIG. 9 is an example of a logical network plane.

The above described processing will be described more specifically by referring to FIGS. 9 to 16. Now, as an example, a network plane of an inventory management system as illustrated in FIG. 9 will be described. The network plane illustrated in FIG. 9 includes nodes "a" to "f", and a branch A is connected to the node "a", a "branch D" is connected to the node "d", and a "main office E" (an inventory management server) is connected to the node "e," respectively. FIG. 9 is an example of a logical network plane.

Figure 12:
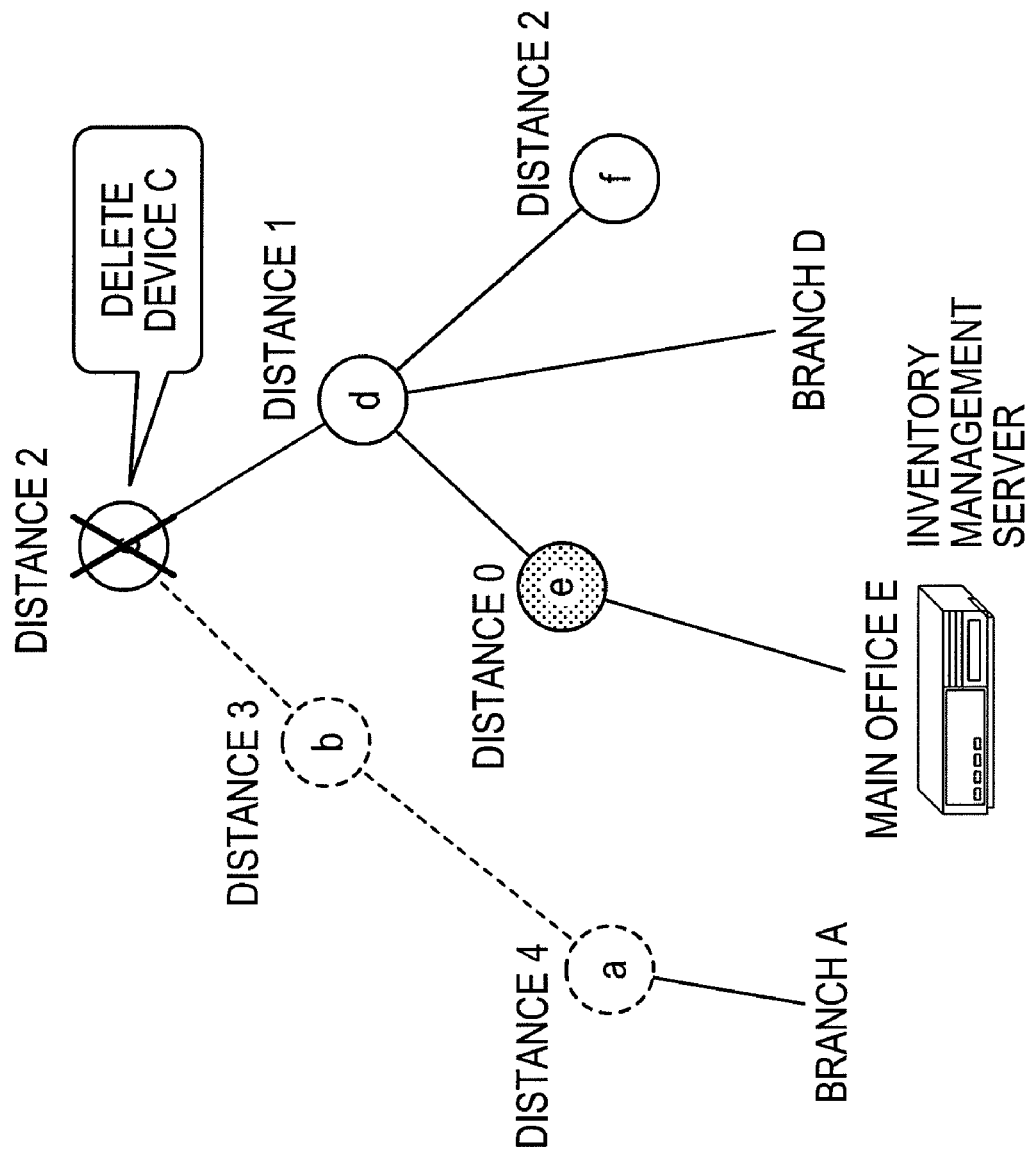
FIG. 12 is an example of a topology from which nodes are deleted.

Under the configuration, when a network management apparatus 10 receives information that the node "c" is deleted by an administrator's device, the apparatus 10 sets a "deletion flag" of the node "c" stored in a node information DB 21 as "deleted," as shown in FIG. 10. Moreover, as illustrated in FIG. 11, the apparatus 10 sets deletion flags of connection information "link b-c" and "link c-d" as "deleted." This means that when the node "c" is deleted, the logical network plane includes nodes "d", "e", and "f", "main office E", and "branch d" as illustrated in FIG. 12.

After reaching a given time, the network management apparatus 10 deletes node information "node c" and connection information "link b-c" with deletion flags "deleted" in the DBs illustrated in FIG. 10 and FIG. 11. Then, the network management apparatus 10 updates the weighted information DB 25, as illustrated in FIGS. 13-14 by deleting the node "b" and the node "a" with distances larger than that of the deleted node "c" from the DB 25.

Figure 15:
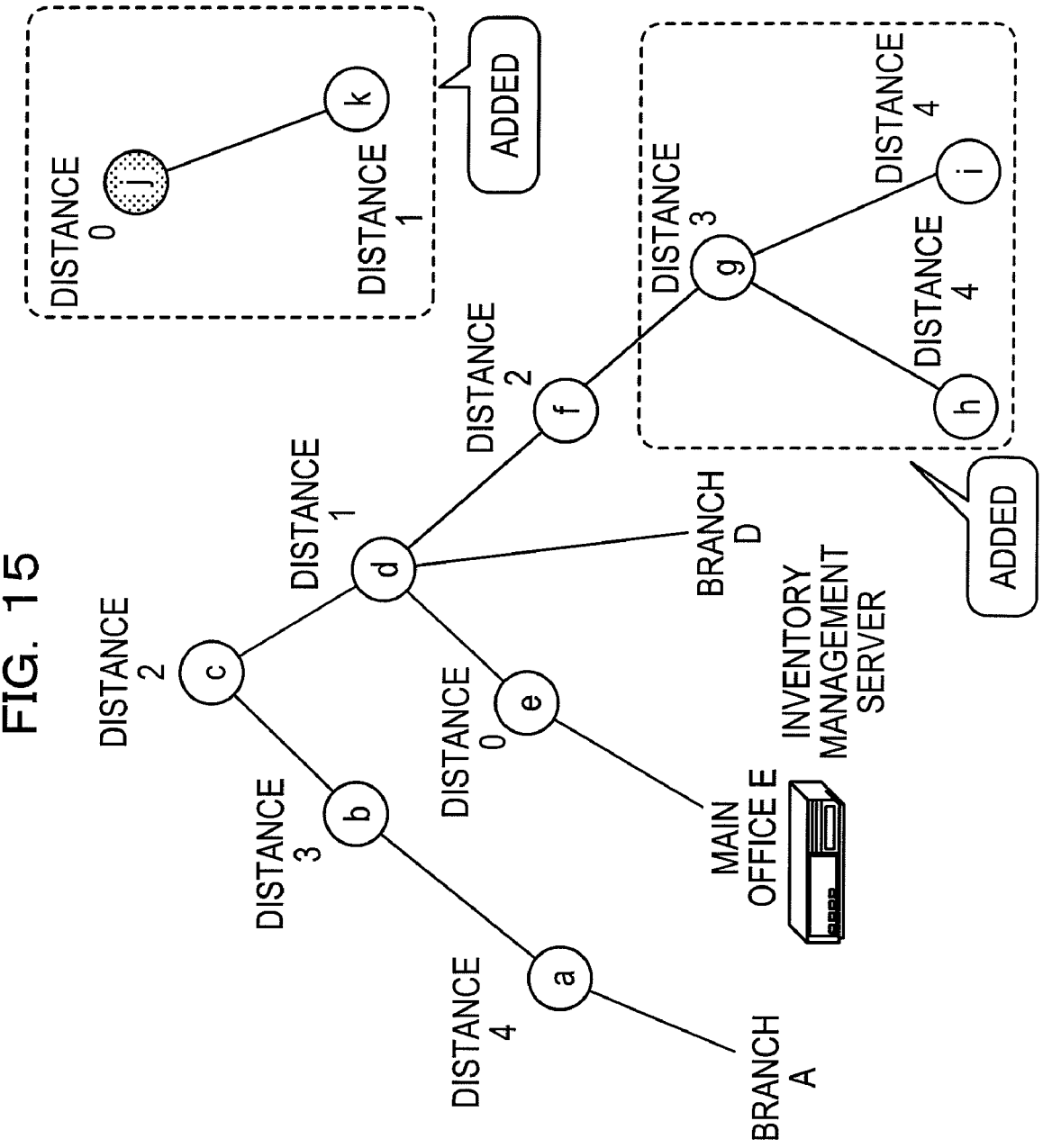
FIG. 15 is an example of a new logical network plane to which nodes are added.

Furthermore, as illustrated in FIG. 15, when nodes "g" to "k" are added, the network management apparatus 10 receives link information for each of added nodes and how the added nodes are connected from an administrator's device. More specifically, the network management apparatus 10 additionally stores information on nodes "g" to "k" in the node information DB 21. Furthermore, the apparatus 10 stores the following in the link information DB22: link information "link f-g" that indicates the node "g" is connected to the node "f", "link g-h" and "link g-i" that indicates the node "h" and the node "i" are connected to the node "g" respectively, and "link j-k" that indicates the node "j" and the node "k" are connected without being connected to any existing nodes.

Figure 16:
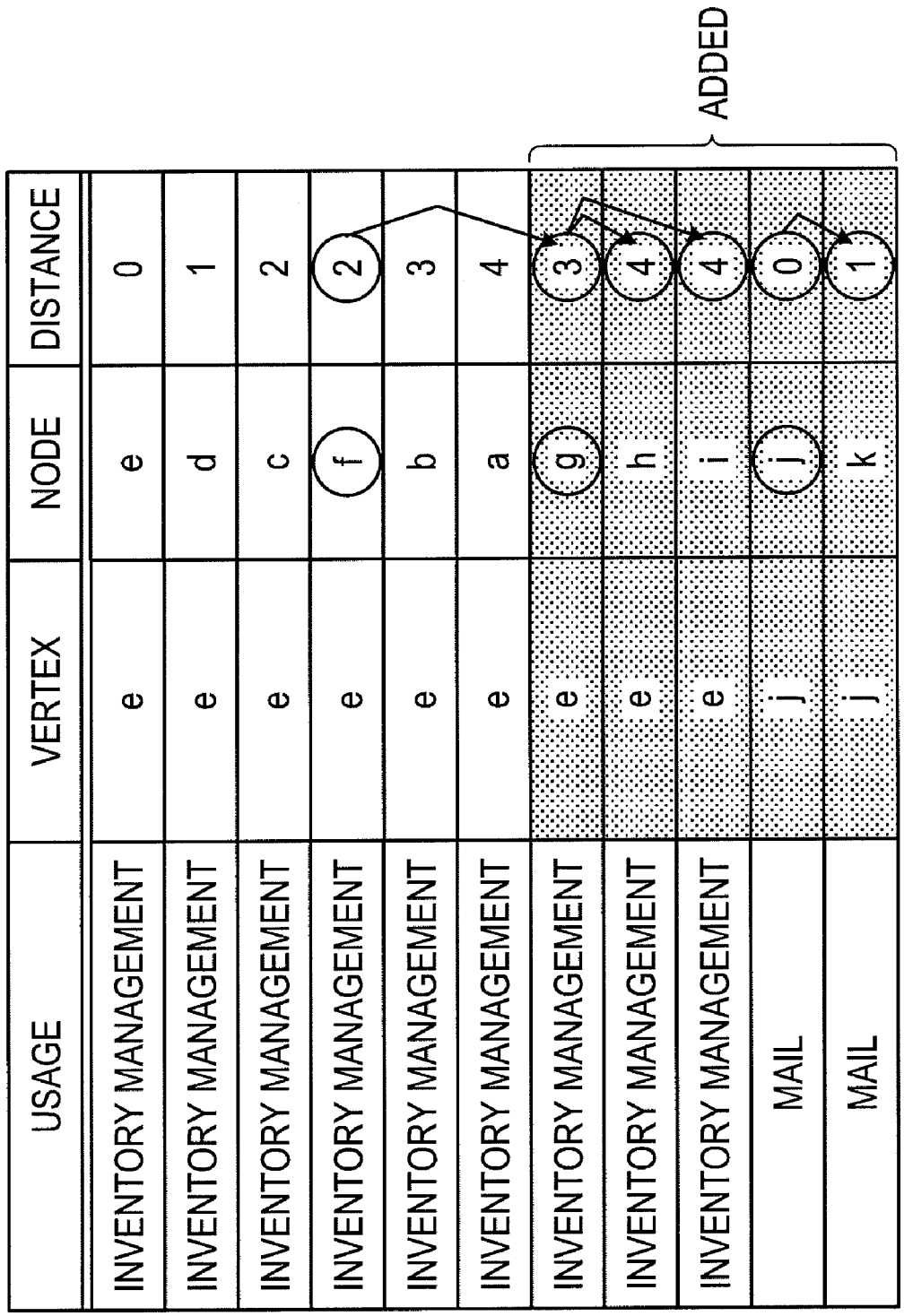
FIG. 16 is an example of information to be stored in a new weighted information DB to which nodes are added.

Then, the network management apparatus 10 creates a new topology (refer to FIG. 15) based on information on nodes added to the node information DB 21, and information on links added to the link information DB 22. Moreover, as illustrated in FIG. 16, the apparatus 10 updates the weighted information DB 25 by calculating distances between nodes.

FIG. 10 is an example of updating a node information DB. FIG. 11 is an example of updating a link information DB. FIG. 12 is an example of a topology from which nodes are deleted. FIG. 13 is an example of calculation of nodes to be deleted in a weighted information DB. FIG. 14 is an example of information to be stored in a new weighted information DB from which nodes are deleted. FIG. 15 is an example of a new logical network plane to which nodes are added. FIG. 16 is an example of information to be stored in a new weighted information DB to which nodes are added.

(Influence Area Identification Processing by Network Management Apparatus)

Figure 17:
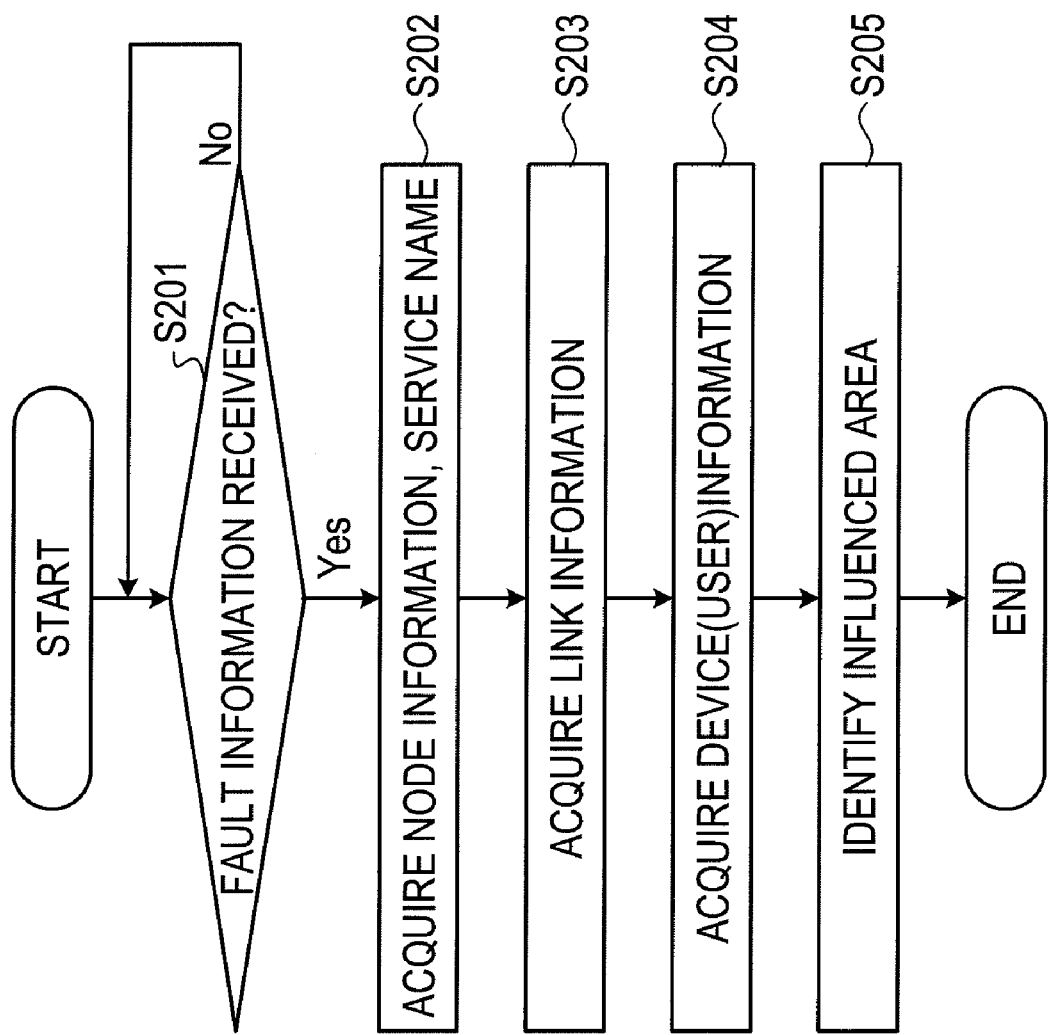
FIG. 17 is a flowchart illustrating processing flow for identifying an area on which a fault influences by the network management apparatus of the first embodiment.

Now, referring to FIG. 17, an influence area identification processing by a network management apparatus will be described. FIG. 17 is a flowchart illustrating processing flow for identifying an area on which a fault influences by the network management apparatus of the first embodiment.

As illustrated in FIG. 17, when a network management apparatus 10 receives fault information from a fault management device via a fault information I/F unit 12 (Step S201; Yes), an influence area identification unit 35 of the network management apparatus 10 acquires nodes with distances larger than a distance for a node identified by the fault information and service names to which the nodes are connected from the weighted information DB 25 (Step S202).

Then based on the acquired nodes, the influence area identification unit 35 of the network management apparatus 10 acquires link information stored in the link information DB 22 based on the acquired nodes (Step S203), and information on devices connected to the nodes indicated by the acquired link information from the node information DB21 (Step S204). Subsequently, the influence area identification unit 35 identifies the acquired device information, the service name and the link information as an area on which the fault influences (Step S205).

Figure 18:
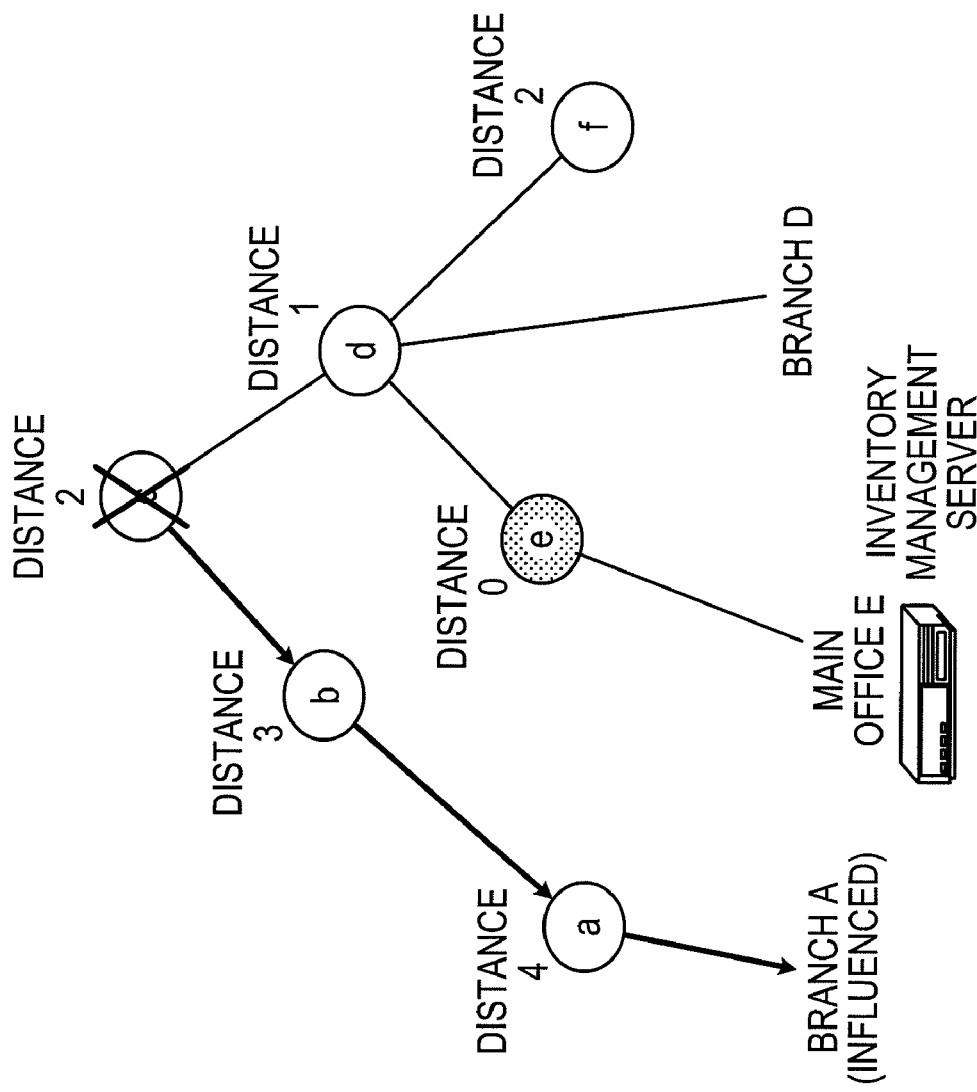
FIG. 18 illustrates an example of a logical network plane.

The above described processing will be described more specifically by referring to FIGS. 18 to 21. Now, as an example, a logical network plane of an inventory management system as illustrated in FIG. 18 will be described. The logical network plane illustrated in FIG. 18 includes nodes "a" to "f", and a "branch A" is connected to the node "a", a "branch D" is connected to the node "d", and a "main office E" (an inventory management server) is connected to the node "e" respectively. FIG. 18 is an example of a logical network plane.

Figure 20:
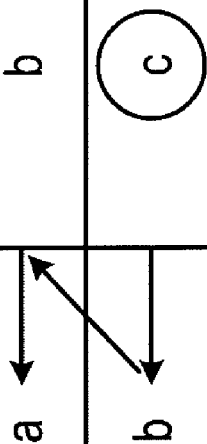
FIG. 20 is an example to identify information on links in an area influenced by a fault.
Figure 21:
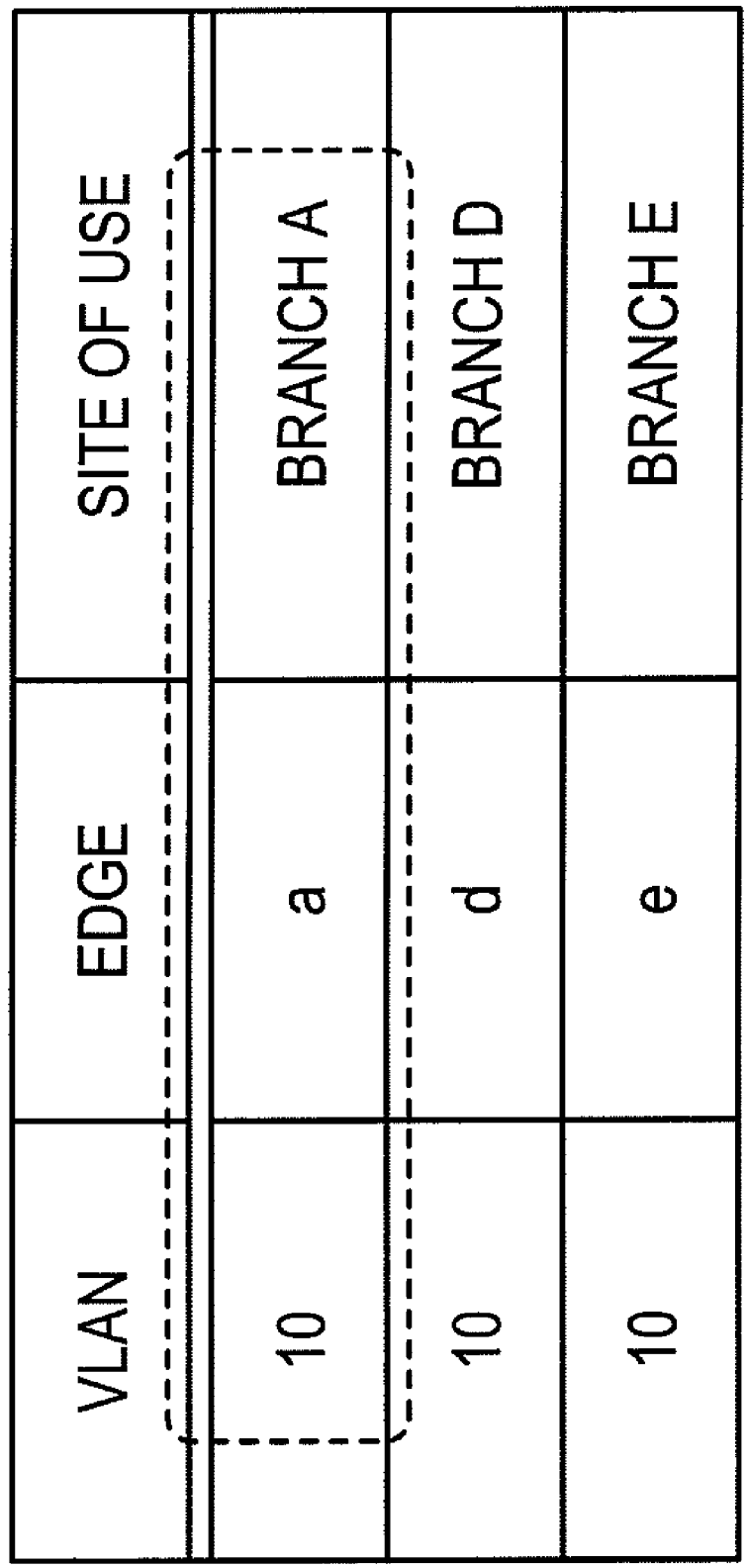
FIG. 21 is an example to identify information on user terminals in an area influenced by a fault.

Under the configuration, when the network management apparatus 10 receives fault information (a fault occurs at a node "c" from the fault management apparatus via a fault information I/F unit 12, the influence area identification unit 35 of the network management apparatus 10 acquires "node b, distance 3", and "node a, distance 4" the distances of which are larger than the distance "2" of the node "c" stored in the weighted information DB 25, and service information "inventory management," as illustrated in FIG. 19. Then, as illustrated in FIG. 20, the influence area identification unit 35 acquires link information (link b-c, link a-b) stored in the link information DB 22 based on the acquired nodes("node b, distance 3", "node a, distance 4"). Subsequently, the influence area identification unit 35 acquires information on a device "branch A" connected to nodes indicated by the acquired link information (link b-c, link a-b) from the node information DB 21, as shown in FIG. 21. Thus, when a fault occurs at the node "c", the network management apparatus 10 identifies the "branch A", the link information (link b-c, link a-b), and the service name "inventory management" as an area on which the fault influences.

FIG. 19 is an example to identify information on nodes in an area influenced by a fault. FIG. 20 is an example to identify information on links in an area influenced by a fault. FIG. 21 is an example to identify information on user terminals in an area influenced by a fault.

Effect of the First Embodiment

According to the first embodiment described above, when information that indicates a fault is received and an area on which a fault in the physical network influences is identified, it is possible to identify the area in units of terminals connected to a logical network plane.

Moreover, manual update by an administrator, etc. may be eliminated even when nodes are added. Even after addition or deletion of nodes, misidentification of an area or a terminal influenced by a fault may be prevented and precise identification may be achieved.

Furthermore, even when user terminals and provided services are increased or decreased, manual update by an administrator, etc. may be eliminated, misidentification of an area or a terminal influenced by a fault may be prevented and precise identification may be achieved.

Embodiment 2

Although the embodiments of the present disclosure have been described, it should be understood that various changes, substitutions, and alterations could be made. Thus, various embodiments will be described below by dividing into the following sections (1) the number of nodes, terminal devices, and virtual networks, (2) system configuration etc., and (3) program.

(1) The Number of Nodes, Terminal Devices, and Virtual Networks

This disclosure is not limited to the number of nodes, service providing devices, terminal devices, and virtual networks described in the first embodiment, and the same effect may be achieved by using any number of nodes, terminal devices and virtual networks respectively.

(2) System Configuration, etc.

Components of each of devices illustrated in figures include functional concepts, and may not necessarily be physically configured as illustrated. This means specific embodiments of distribution and integration of each of devices are not limited to those illustrated in figures, and a whole or a part of the embodiments may be physically distributed or integrated (for example, integrating a fault information reception unit and an influence area identification unit) in a given unit depending on various loads or status of use. An entire or a part of processing functions performed by each device may be achieved by a central processing unit (CPU), and a program analyzed and executed by the CPU, or by a hardware using a wired logic.

Among processing described in the above embodiment, an entire or a part of processing that are explained as automatic processing (for example, updating various DBs such as a node information DB, and a link information DB) may be manually performed. Moreover, processing procedures, control procedures, specific names, and information that includes various data or parameters (for example, FIG. 3 to FIG. 7) may be optionally changed unless otherwise specified.

(3) Program

Various processing described in the above embodiments may be achieved by causing a computer system such as a personal computer or a workstation to execute a prepared program. Therefore, as another embodiment of this disclosure, a computer system executing a program that has similar functions as the above embodiments will be described below.

Figure 22:
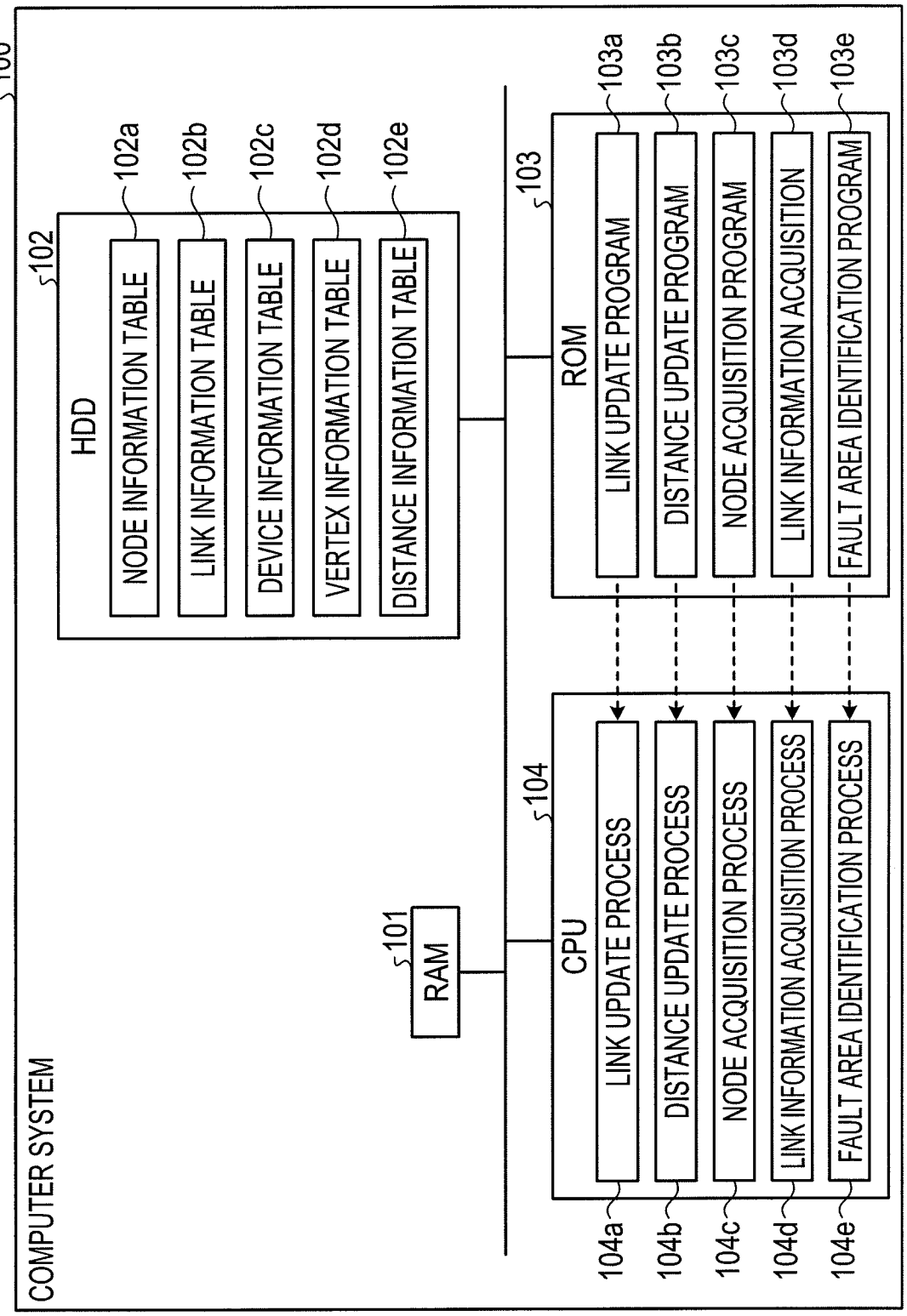
FIG. 22 is an example of a computer running a program for identifying an area on which a fault influences.
Figure 23:
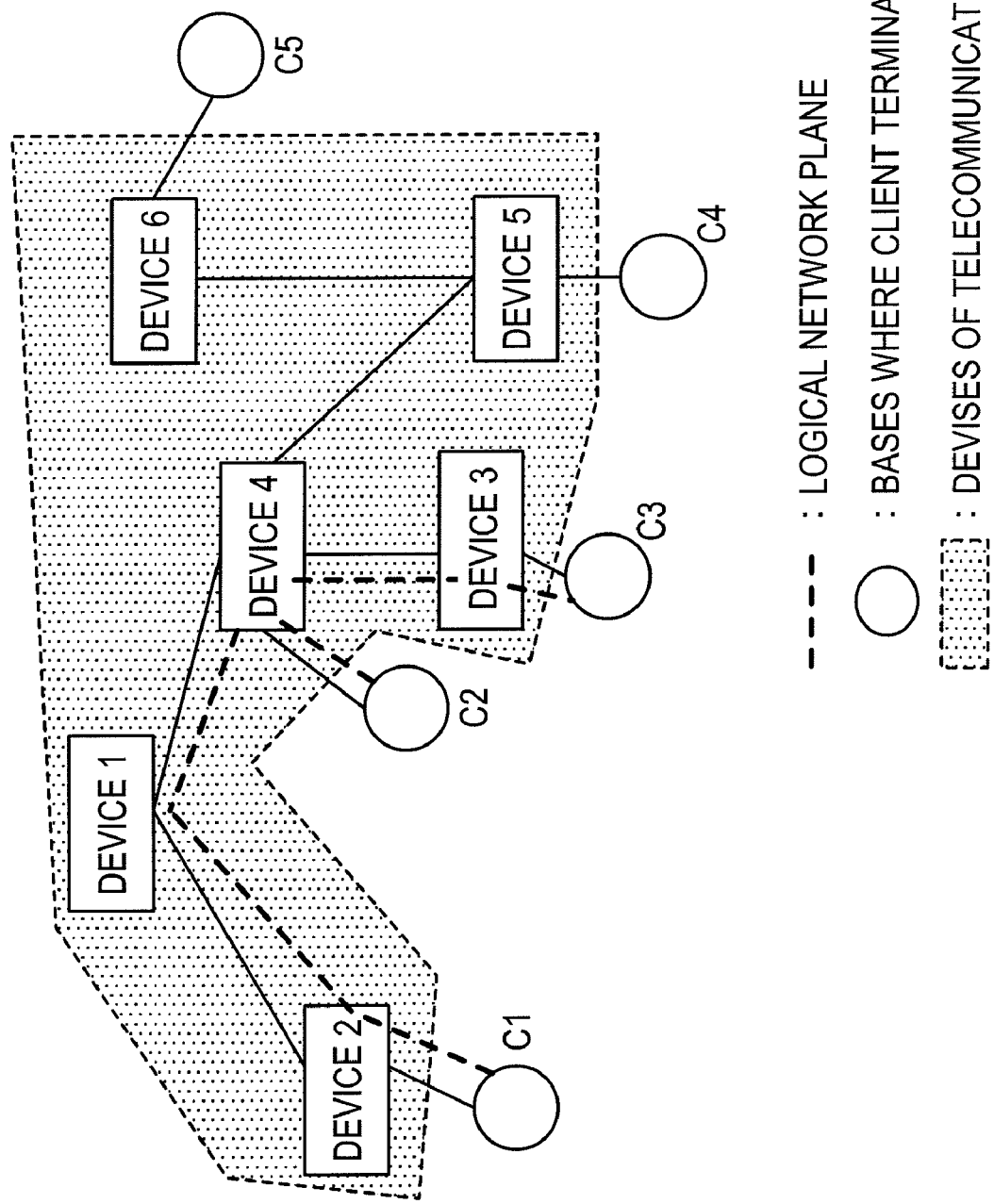
FIGS. 23 to 25 illustrate a conventional technology.
Figure 24:
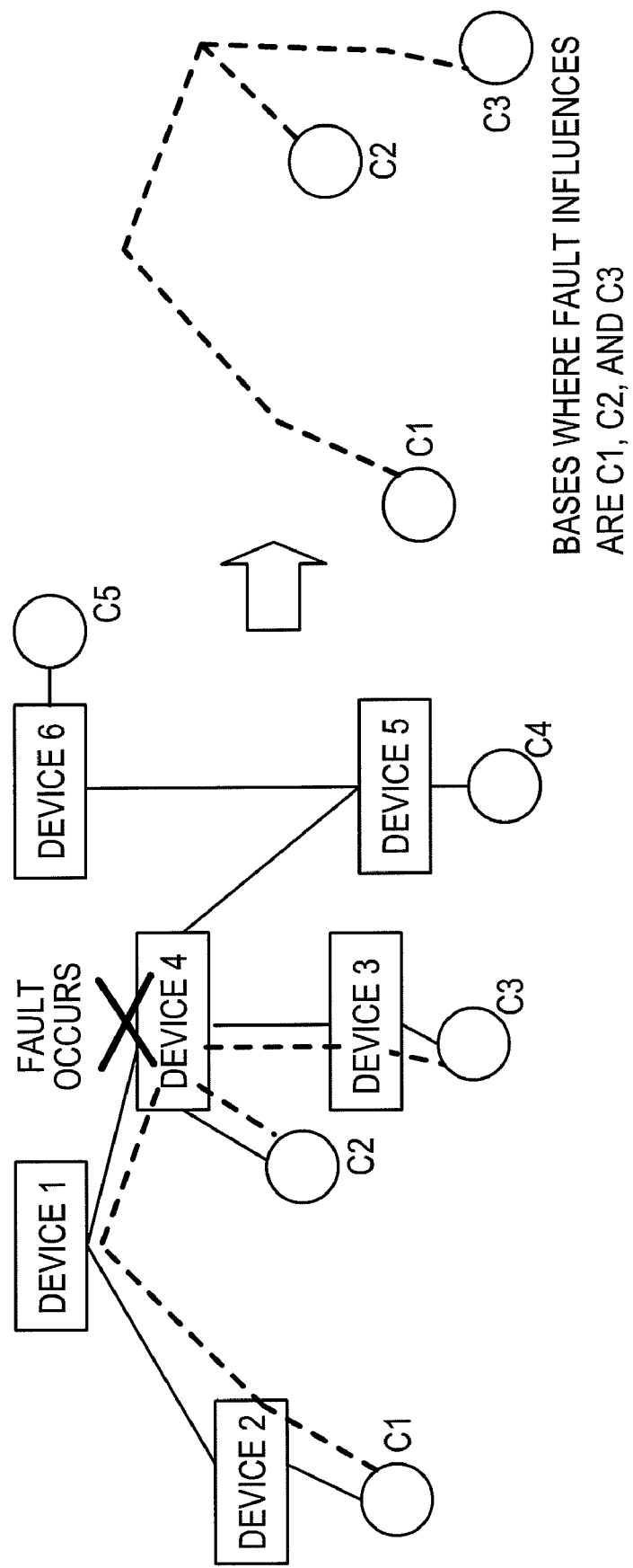
Figure 25:
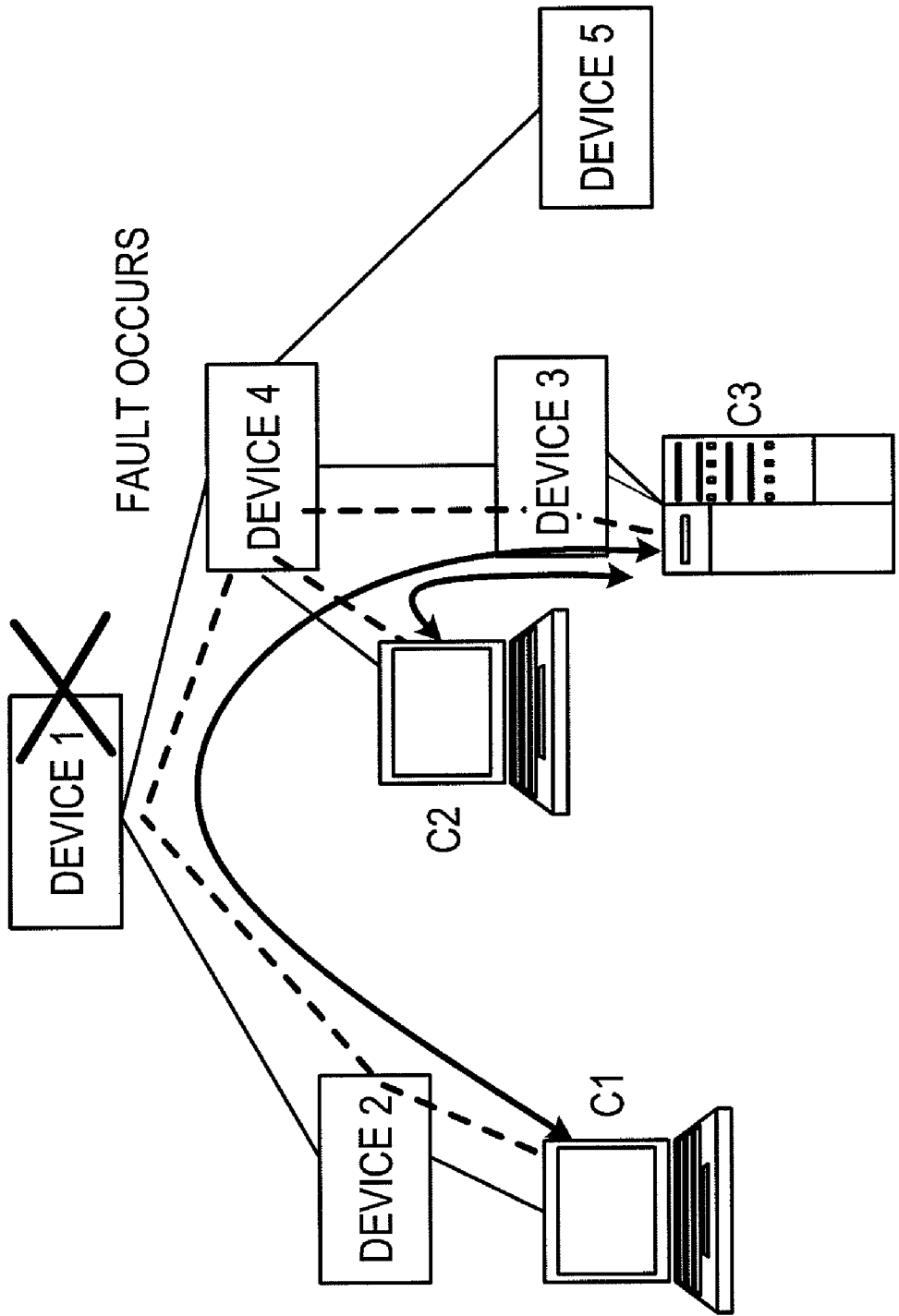

FIG. 22 is an example of a computer running a program for identifying an area on which a fault influences. As illustrated in FIG. 22, a computer system 100 includes a RAM (Random Access Memory) 101, a HDD (Hard Disk Drive) 102, a ROM (Read-Only Memory) 103, and a CPU (Central Processing Unit) 104. The ROM 103 stores programs that have similar functions as the above embodiments, which are a link update program 103a, a distance update program 103b, and a node acquisition program 103c, a link information acquisition 103d, and a fault area identification program 103e as illustrated in FIG. 22.

Reading and executing these programs 103a to 103e by the CPU 104 creates a link update process 104a, a distance update process 104b, a node acquisition process 104c, a link information acquisition process 104d, and a fault area identification process 104e, as illustrated in FIG. 22. Note that the link update process 104a corresponds to a network configuration input processing unit 31 and a base information/usage input processing unit 32 in FIG. 2. Likewise, the distance update process 104b corresponds to a topology analysis processing unit 33. Moreover, the node acquisition process 104c, a link information acquisition process 104d, and a fault area identification process 104e correspond to the influence area identification unit 35.

A HDD 102 includes a node information table 102a, a link information table 102b, a device information table 102c, a vertex information table 102d, and a distance information table 102e. The node information table 102a stores information on each of a plurality of nodes. The link information table 102b stores link information that indicates connection relationships between nodes in a physical network and information on a logical network to which the link information belongs. The device information table 102c stores a node to which a terminal is connected and information on a logical network to which the terminal belongs to by associating with the terminal. The vertex information table 102d stores service names that indicate various services by associating with nodes connected to service providing devices that provides the services. The distance information table 102e stores a node connected to a service providing device, a distance between another node and the node to which the service providing device is connected by associating with a service name that indicates the various services. The node information table 102a corresponds to the node information DB21 in FIG. 2. The link information table 102b corresponds to the link information DB22 in FIG. 2. The device information table 102c corresponds to the user information DB23 in FIG. 2. The vertex information table 102d corresponds to a vertex information DB 24 in FIG. 2. The distance information table 102e corresponds to a weighted information DB 25 in FIG. 2.

The above described programs 103a to 103e are not necessarily stored in the ROM 103. For instance, the program may be stored in "a portable physical medium", "a fixed physical medium" or "other computer system" and read and executed by a computer system 100. The "portable physical medium" includes a flexible disk (FD), a compact disk read-only-memory (CD-ROM), a magneto-optical disk (MO), a digital video disk (DVD), and an integrated circuit (IC) card inserted into the inside or outside of the computer system 100. The fixed physical medium includes a hard disk drive (HDD) provided within or outside of a computer. Other computer system is connected to a computer system 100 via a public network, the Internet, a LAN or a WAN.

What is claimed is:

1. A network management apparatus to manage a physical network, which comprises a plurality of nodes, a service providing device coupled to one of the nodes, and a user terminal device coupled to another node, and to manage a logical network assigned to the physical network, said network management apparatus comprising:

a storage unit comprising:

a link information storage unit storing link information including a connection relationship between the nodes in the physical network and a logical identifier that belongs to the connection relationship;

a device information storage unit to store a device identifier indicating a particular device among the service providing device and the user terminal device, a first node identifier indicating a first node coupled with the particular device, and the logical identifier associated with the particular device;

a distance information storage unit to store a usage identifier indicating a service provided by the service providing device, a second node identifier indicating a second node coupled with the service providing device, a third node identifier indicating a third node, and a connection number between the second node and the third node; and a control unit comprising:

a node acquisition unit, when fault information is received, to acquire the third node identifier stored in the distance information storage unit associated with the connection number larger than another connection number for a node identified by the fault information, and the usage identifier associated with the acquired third node identifier from the distance information storage unit;

a link information acquisition unit to acquire the link information stored in the link information storage unit based on the third node identifier acquired by the node acquisition unit; and an influence area identification unit to acquire a device identifier based on the link information acquired by the link information acquisition unit, and to identify the acquired device identifier, the usage identifier associated with the acquired device identifier and the acquired link information acquired by the link information acquisition unit as an area on which a fault influences.

2. The network management apparatus according to claim 1, wherein:

the storage unit further comprises:
a node information storage unit to store node information including a node identifier and a deletion identifier indicating a status of a particular node; and the control unit further comprises:
a link information update unit, when changes are made by addition or deletion of node information to and from the node information storage unit, to update the link information stored in the link information storage unit based on information on changed nodes; and
a distance update unit, when the link information stored in the link information storage unit is updated, to create a topology of the network and to update information stored in the distance information storage unit based on the created topology.

3. The network management apparatus according to claim 2, wherein:

the storage unit further comprises:
a vertex information storage unit to store the usage identifier and a vertex side identifier associated with each service providing device ; and the distance update unit, when changes are made by addition or deletion of terminals to and from the device information storage unit, or of service providing devices to and from the vertex information storage unit, creates the topology of the network, and updates the information stored in the distance information storage unit based on the topology.

4. A network management method for managing a physical network, which comprises a plurality of nodes a service providing device connected to one of the plurality of nodes, and a user terminal device coupled to another node, and to manage a logical network assigned to the physical network, the network management method suitable for identifying a fault occurring in the physical network and comprising:

storing link information including a connection relationship between the nodes in the physical network and a logical identifier that belongs to the connection relationship;

storing a device identifier indicating a particular device among the service providing device and the user terminal device a first node identifier indicating a first node coupled with the particular device, and the logical identifier associated with the particular device;

storing, in a distance information storage unit, a usage identifier indicating a service provided by the service providing device , a second node identifier indicating a second node coupled with the service providing device, a third node identifier indicating a third node, and a connection number between the second node and the third node;

acquiring, when fault information is received, the stored third node identifier associated with the connection number larger than another connection number for a node identified by the fault information and the usage identifier associated with the acquired third node identifier;

acquiring the stored link information based on the acquired third node identifier; and identifying an influence area by first acquiring a device identifier based on the acquired link information, and then identifying the acquired device identifier, the usage identifier associated with the acquired device identifier, and the acquired link information as an area on which the fault influences.

5. The network management method according to claim 4, further comprising:

storing node information including a node identifier and a deletion identifier indicating a status of a particular node;

when changes are made by addition or deletion of nodes, updating the stored link information based on information on the changed nodes; and when the stored link information is updated, creating a topology of the network and updating stored information in the distance information storage unit based on the created topology.

6. The network management method according to claim 5, further comprising:

storing the usage identifier and a vertex side identifier associated with each service providing device, and when changes are made by addition or deletion of terminals or of service providing devices, creating the topology of the network and updating the stored information in the distance information storage unit based on the topology.

* * * * *